United States Patent [19]

Sternitzky

[11] Patent Number: 5,779,416

[45] Date of Patent: Jul. 14, 1998

[54] BOLT/STUD AND NUT FOR ENHANCED HIGH-CYCLE FATIGUE CAPABILITY

[75] Inventor: Kevin W. Sternitzky, Easley, S.C.

[73] Assignee: General Electric Co., Schenectady, N.Y.

[21] Appl. No.: 738,644

[22] Filed: Oct. 30, 1996

[51] Int. Cl.[6] .................................................. F16B 35/04
[52] U.S. Cl. ............................ 411/411; 411/424; 411/938
[58] Field of Search ................................. 411/389, 423, 411/424, 436, 937.1, 411, 916, 917, 392, 938

[56] References Cited

U.S. PATENT DOCUMENTS

| | | | |
|---|---|---|---|
| 1,149,518 | 8/1915 | Holmes | 411/916 |
| 1,926,925 | 9/1933 | Wescott | 411/916 |
| 1,939,769 | 12/1933 | Eksergian | 411/389 |
| 2,255,384 | 9/1941 | Hood | 411/436 |
| 2,371,614 | 3/1945 | Graves | 411/916 |
| 3,455,587 | 7/1969 | Gallois | 411/389 |
| 3,521,413 | 7/1970 | Scott | 411/389 |
| 4,229,875 | 10/1980 | Crispell | 411/392 |
| 4,496,259 | 1/1985 | Foucher | 411/389 |
| 4,743,138 | 5/1988 | Goy | 411/389 |
| 4,887,949 | 12/1989 | Dimmick, III | 411/392 |
| 4,912,809 | 4/1990 | Scheuer | 411/424 |
| 5,123,793 | 6/1992 | Bonstein | 411/937.1 |

FOREIGN PATENT DOCUMENTS 2074280  10/1981  United Kingdom .................. 411/436

OTHER PUBLICATIONS

"Standard Handbook of Machine Design", Shigley et al.; p. 23.35, McGraw–Hill Book Company, 1986.

Primary Examiner—Steven N. Meyers
Assistant Examiner—Gary Estremsky
Attorney, Agent, or Firm—Nixon & Vanderhye

[57] ABSTRACT

The bolt or stud shaft and nut combination includes an undercut of the first thread of the shaft adjacent the load face of the nut, the undercut having a compound fillet with the smaller radius lying between the larger radius and the first thread of the shaft. The shaft threads are buried two threads deep into the nut so that the first two teeth of the nut do not contact the threads of the shaft and overlie the undercut. The nut threads have a taper opening the pitch diameter in a direction towards the loaded face. The combination affords resistance to high-cycle fatigue of rotating structures joined together by the bolt or stud shaft and nut combination.

12 Claims, 4 Drawing Sheets

BOLT/STUD AND NUT FOR ENHANCED HIGH-CYCLE FATIGUE CAPABILITY

TECHNICAL FIELD

The present invention relates to a bolt or a stud and nut combination for use in rotating structures to enhance the resistance of the bolt or stud to high-cycle fatigue and particularly to a bolt or stud and nut combination cooperable and configured to more uniformly distribute the stress concentration along the stud or bolt.

BACKGROUND

Rotating structures, for example, rotating parts of a turbine, are frequently joined to one another by a bolted joint. In such rotating structures, cycle fatigue at high speeds, for example, 60 cycles per second, can result in failure of the bolt or stud. It has been found that bolt or stud failure resulting from high-cycle fatigue consistently occurs at a location corresponding to the peak stress on the stud, i.e., at the first thread of the bolt or stud loaded by the nut adjacent its load face. The bolt or stud will fail at that location because it sees the high peak stress.

In the literature, there is a bolted joint design for fatigue resistance which employs a tension nut. This design employs a special nut for loading the threads in the middle of the nut first, thereby distributing the load over additional threads, and reducing the load of the first loaded thread of the bolt or stud at the load face. This design, however, requires a nut much larger than a standard nut in order to isolate the first thread and still have adequate crush stress capability at the load face surface. In a rotating structure, a larger nut of this type causes substantial increase in the centrifugal load due to its additional weight and its size often prevents it from being retrofitted into existing designs.

DISCLOSURE OF THE INVENTION

According to the present invention, there is provided a bolt or stud and nut combination which is highly resistant to high-cycle fatigue. This is accomplished by distributing the loading more effectively along the length of the bolt or stud and reducing the stress concentration in the first engaged thread of the bolt or stud nearest the loaded surface of the nut. To accomplish that, the present invention provides a bolt or stud and nut combination wherein the stud is undercut directly adjacent its first thread. Additionally, the stud threads may be buried one or two or more threads deep into the nut so that the first one or two or more teeth of the nut lie out of contact with the threads of the stud. This causes the nut to carry more of the load than it would otherwise if the bolt or stud threads ran wholly out of the nut. The area of the nut uncoupled to the bolt or stud lies in compression and allows the threads to better distribute the load along the bolt or stud threads. The nut is essentially more compliant.

The undercut along the bolt or stud is preferably formed of a compound fillet which leads to and undercuts the first thread on the bolt or stud. The compound fillet reduces the ability of the first thread to carry load and, in effect, softens the first thread. Consequently, the peak stress is distributed from the first tooth to the following threads. The compound fillet comprises adjacent small and large radii, with the small radius lying between the large radius and the first tooth of the bolt or stud. This particular structure softens the load-bearing capability of the first thread and distributes the load further along the bolt or stud to its other threads. Additionally, the nut threads have a taper running 50% of the nut length opening the pitch diameter in a direction toward the loaded face of the nut. These features combine to reduce the stress concentration in the first thread of the bolt or stud which otherwise is the typical location for high-cycle fatigue failure in bolts or studs.

In a preferred embodiment according to the present invention, there is provided apparatus for connecting rotatable structures to one another, comprising first and second structures rotatable about an axis and having openings in registration one with the other in an axial direction of the structures, an elongated shaft passing through the registering openings and having threads at least adjacent one end of the shaft, the shaft having an unthreaded portion adjacent the threads and located on a side of the threads remote from one end of the shaft and a nut having threads for threaded engagement with the threads of the shaft and a surface for bearing engagement against one of the structures, the nut having at least one thread closer to the surface than remaining threads on the nut and overlying the unthreaded portion of the shaft, one thread of the nut being out of contact with the threads of the shaft whereby the shaft is resistant to high-cycle fatigue caused by rotation of the structures.

In a further preferred embodiment according to the present invention, there is provided apparatus for connecting rotatable structures to one another, comprising first and second structures rotatable about an axis and having openings for registration one with the other in an axial direction of the structures, an elongated shaft passing through the registering openings and having threads at least adjacent one end of the shaft, the shaft having an unthreaded portion adjacent the threads and located on a side of the threads remote from one end of the shaft, a nut having threads for threaded engagement with the threads of the shaft and a surface for bearing engagement against one of the structures, the unthreaded portion of the shaft being undercut to a diameter reduced relative to a diameter of the shaft passing through the registering openings, the undercut unthreaded portion including a fillet for transitioning between the undercut and a first thread on the shaft adjacent the undercut and engaging a first of the remaining threads of the nut.

Accordingly, it is a primary object of the present invention to provide a bolt or stud and nut combination specifically configured for resistance to high-cycle fatigue and stress cracking of the bolt or stud.

BEST MODE FOR CARRYING OUT THE INVENTION

Figure 1:
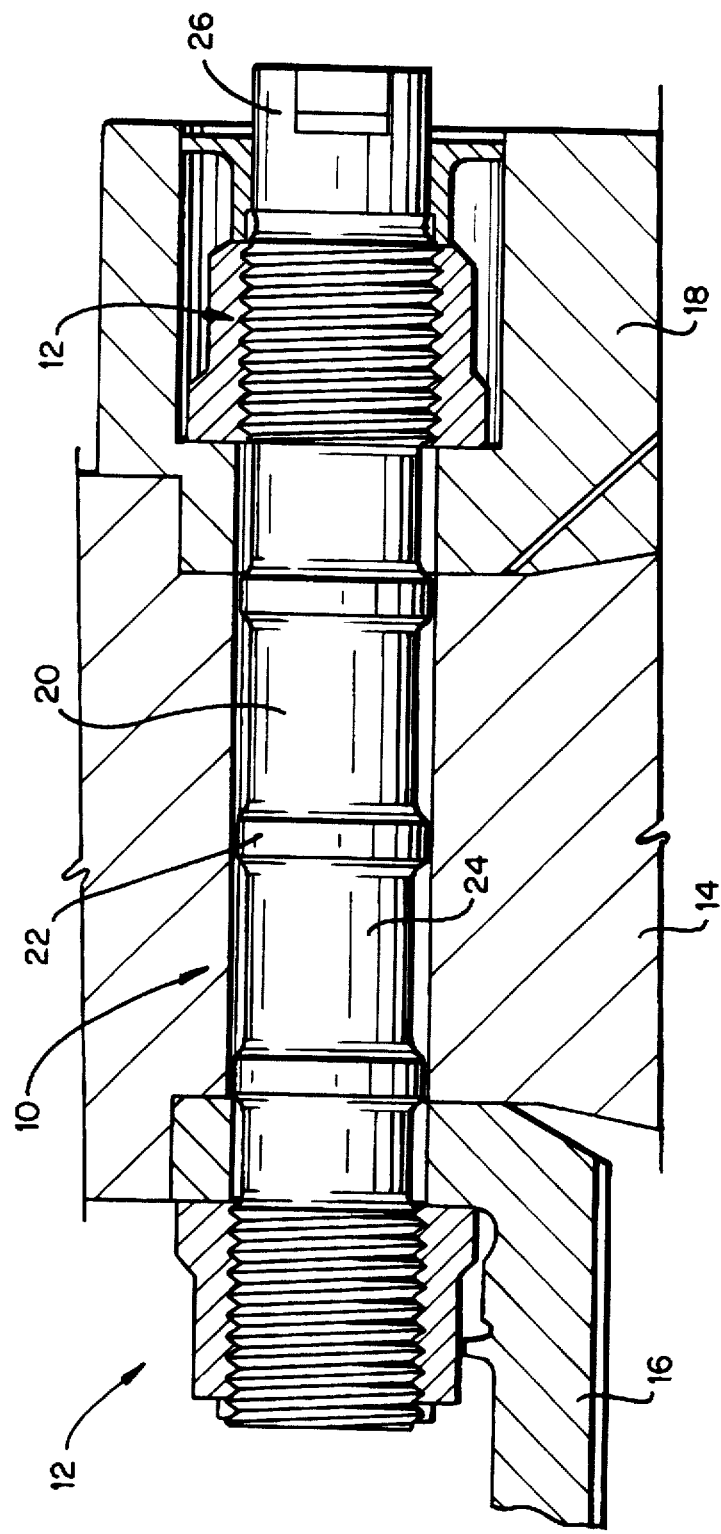
FIG. 1 is a cross-sectional view through portions of rotating structures illustrating a bolt or stud and nut combination constructed in accordance with the present invention.

Referring now to the drawings, particularly to FIG. 1, there is illustrated a plurality of rotating structures joined together by a bolt or stud and nut combination according to the present invention. For example, the bolt or stud, generally indicated 10, and nut, generally indicated 12, are used to interconnect a turbine wheel 14, a spacer 16 between the turbine wheel 14 and another turbine wheel, not shown, and a flange 18 on a shaft, not shown. It will be appreciated that the structures 14, 16 and 18 rotate about an axis radially offset from and parallel to the elongated axis of the bolt or stud 10. The present invention has applicability to both bolts and studs and the discussion herein assumes the equivalency of bolts and studs, except as otherwise noted, the bolts or studs sometimes being referred to as elongated shafts having threads therealong.

The bolt or stud 10 illustrated in FIG. 1 includes an elongated shaft 20 which, in a central portion intermediate its ends, includes a plurality of ribs 22 constituting the shaft diameter and which ribs 22 are axially spaced one from the other. Intermediate the ribs 22 and between threads on opposite ends of the bolt or stud 10 are reduced diameter portions 24 which reduce the stiffness of the bolt or stud. The bolt or stud 10 has a head 26 at one end.

Figure 2:
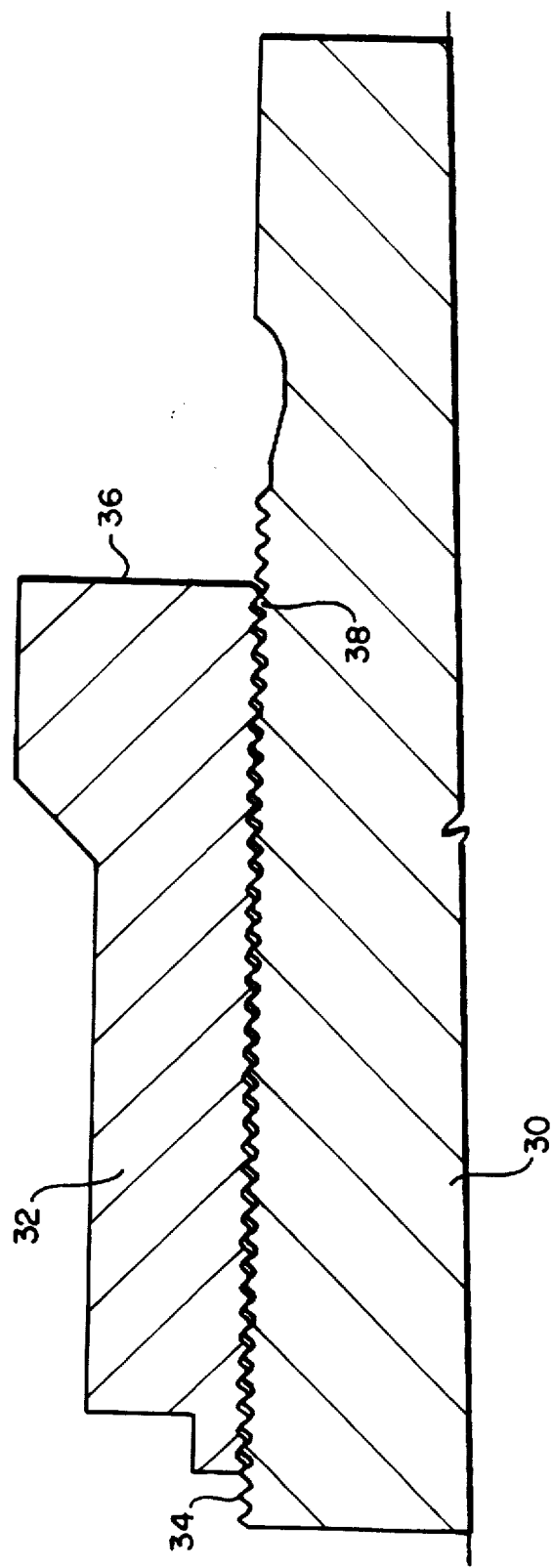
FIG. 2 is a fragmentary cross-sectional view of a nut and bolt combination according to the prior art.

Referring now to the prior art of FIG. 2, a portion of the end of a bolt or a stud is illustrated at 30. A prior art nut 32 is threadedly received on the threads 34 of the stud. In the bolt or stud and nut combination of the prior art illustrated in FIG. 2, it will be appreciated that the final secured configuration is as illustrated, with the threads 34 of the stud running out from the load surface end 36 of nut 32. It has been discovered that the peak stress caused by high-cycle fatigue typically and consistently occurs at the first thread 38 of the bolt or stud which is engaged by the first thread of the nut.

Figure 3:
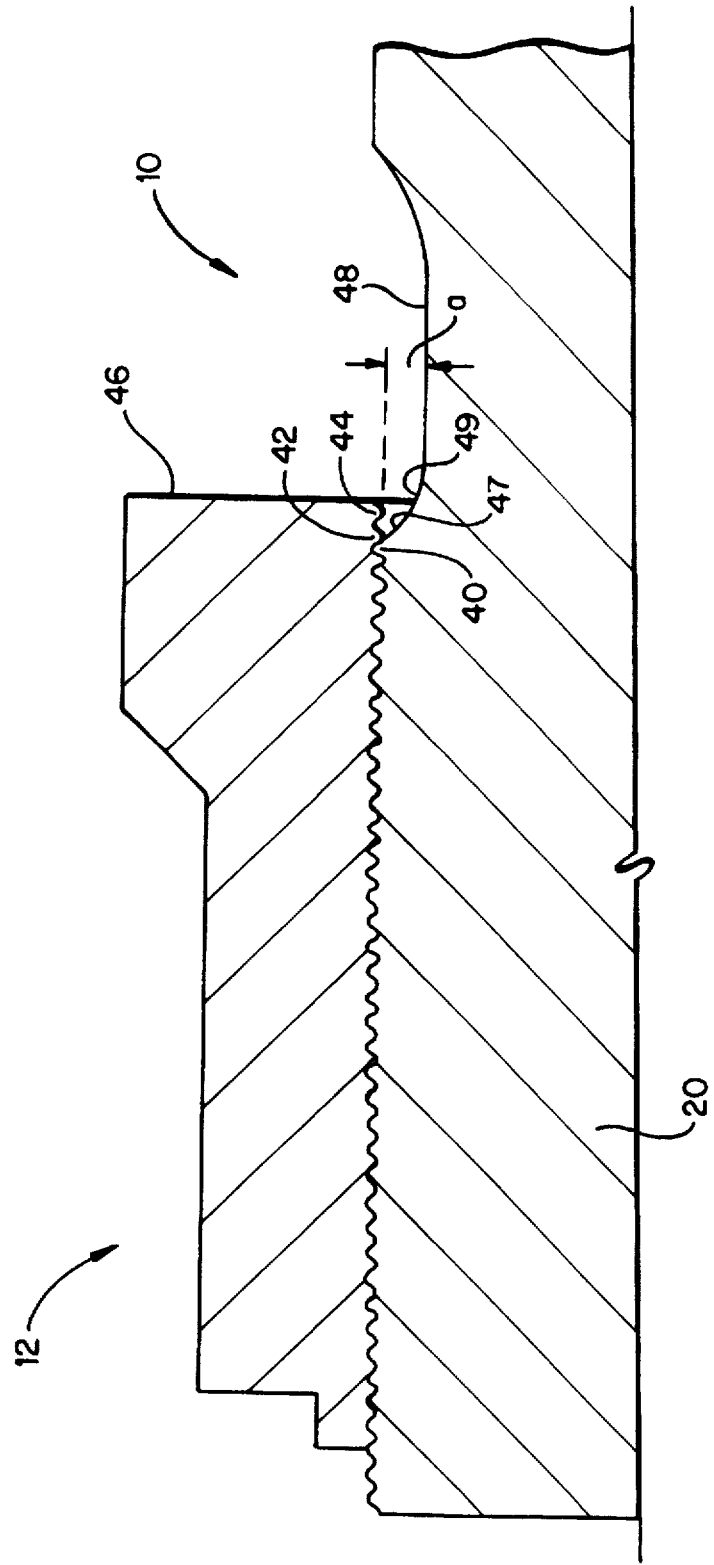
FIG. 3 is an enlarged fragmentary cross-sectional view of the bolt or stud combination at the lefthand end of the rotating structure illustrated in FIG. 1.
Figure 4:
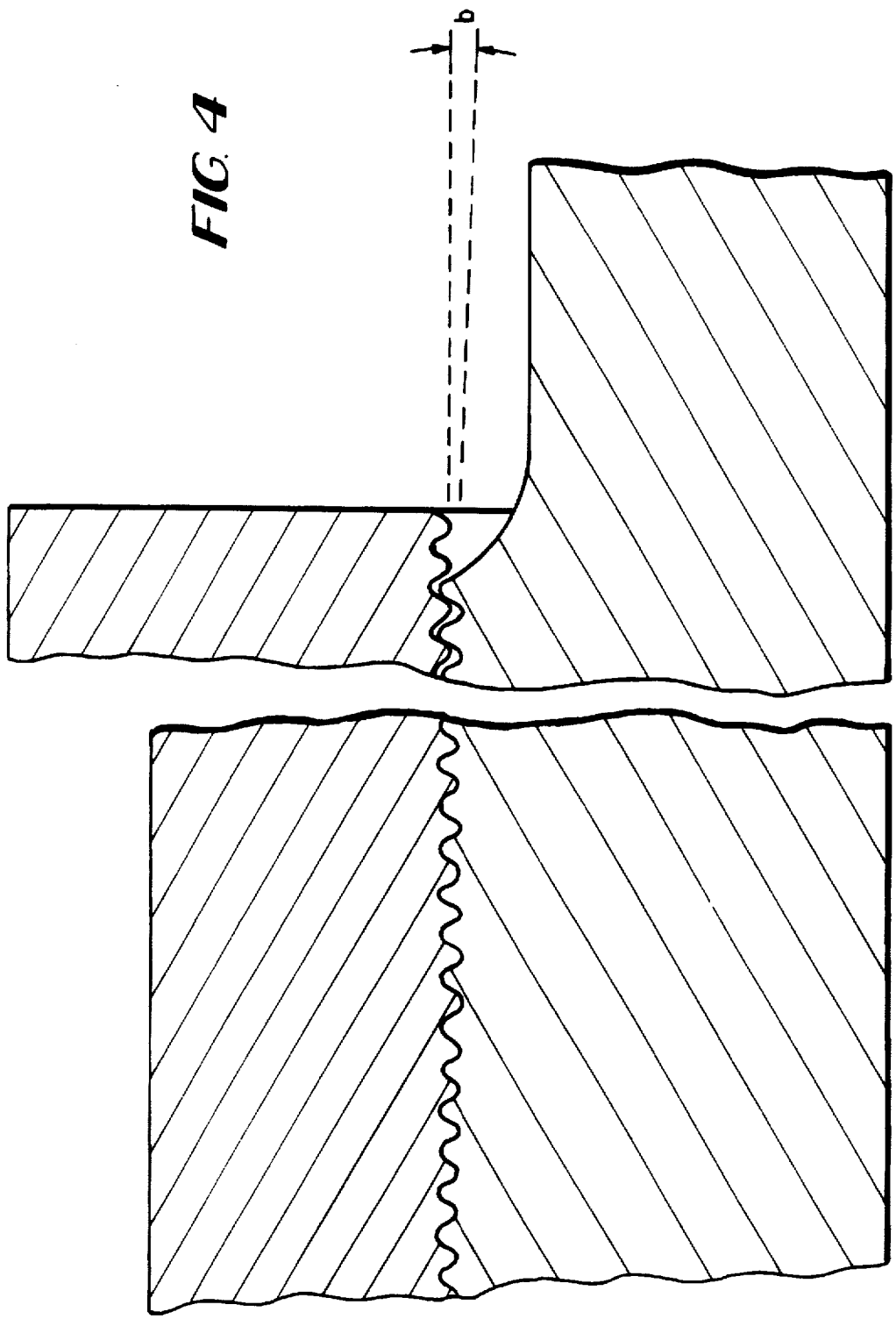
FIG. 4 is an enlarged fragmentary cross-sectional view on an exaggerated scale illustrating the taper of the threads of the nut relative to the threads of the stud.

Referring now to FIGS. 1 and 3, the lefthand end of FIG. 1 is shown in FIG. 3 without the spacer and the remaining portion of the shaft 20. The bolt or stud 10 and nut 12 combination are illustrated in FIG. 3 in their positions of final securement with the end face of the nut under loading and bearing against one of the joined rotatable structures. In that illustrated position, it will be appreciated that the first thread 40 on the bolt or stud engages within the nut 12 by two threads 42 and 44. That is, at least one, and preferably both of the threads 42 and 44 lie out of contact with the stud or bolt 10. It will be appreciated that the nut is in compression and by locating the thread or threads out of contact with the stud, the unloaded area of the nut is in compression and allows the remaining threads of the nut to distribute the load along the threads of the stud. The area of the nut between the first engaged thread 40 of the bolt or stud and the engaging end surface 44 of the nut essentially renders the nut more compliant and, in effect, reduces the load carried by the first thread of the stud, hence avoiding a peak stress.

To enhance the ability of the first thread 40 of the bolt or stud to enable better distribution of the loading along the remaining threads of the stud, the shaft 20 is undercut at 48, i.e., the shaft has a reduced diameter portion 48. More specifically, the juncture between the reduced diameter portion 48 of the bolt or stud and the first tooth 40 comprises a compound fillet having different radii portions transitioning between the reduced diameter portion 48 and first tooth 40. The smallest radius 47 of the compound fillet lies between the largest radius 49 thereof and the first tooth 40. The compound fillet thus undercuts the first thread 40 and reduces its ability to carry load.

Also in accordance with the present invention, the difference a between the major diameter and the reduced diameter portion or undercut 48 is significant. To optimize both the pre-load that the stud can carry, and the high-cycle fatigue capability of the stud, the undercut diameter should be between 3 to 5 thread pitch less than the major diameter. For example, if the stud threads are 10 threads per inch, then he pitch is 0.1 inch. If the major diameter is 2 inches, then the undercut diameter would need to be between 1.7 and 1.5 (between 2−(3×0.1) and 2−(5×0.1)). We found that a 4-thread pitch reduction in diameter optimized the design for this particular application. This, in effect, softens the first tooth 40 enabling the load to be distributed along the remaining teeth, the peak stress otherwise at that location to be distributed from the first thread along the remaining threads.

Additionally, the nut threads have a taper running 50% of the nut length opening the itch diameter in a direction toward the loaded face 46. For example, the pitch diameter may increase from left to right in FIG. 3 towards the loaded face 46 by about 0.004 inches. The stud threads, however, are not tapered. The taper of the threads of the nut relative to the constant diameter of the threads of the stud is illustrated at b.

Accordingly, it will be appreciated that the objects of the present invention are fully accomplished in the foregoing in that the stress concentration along the stud has been distributed along its threads such that enhanced resistance to high-cycle fatigue is afforded.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for enhanced high cycle fatigue capability, comprising:

first and second structures rotatable about an axis and having openings in registration one with the other in an axial direction of the structures;

an elongated shaft passing through the registering openings and having threads at least adjacent one end of said shaft, said shaft having an unthreaded portion adjacent said threads and located on a side of said threads remote from said one end of said shaft; and a nut having threads for threaded engagement with the threads of said shaft and a surface for bearing engagement against one of said structures, said nut having at least one thread closer to said surface than remaining threads on said nut and overlying said unthreaded portion of said shaft, said one thread of said nut being out of contact with the threads of said shaft whereby said shaft is resistant to high-cycle fatigue caused by rotation of said structures; said unthreaded portion of said shaft being undercut to a diameter reduced relative to a diameter of the shaft passing through the registering openings and including a compound fillet of different radii for transitioning between said undercut and a first thread on the shaft adjacent said undercut and engaging a first of said remaining threads of said nut.

2. Apparatus according to claim 1 wherein said nut has at least two threads closer to said surface than remaining threads on said nut and overlying said unthreaded portion of said shaft, said two threads being out of contact with the threads of said shaft.

3. Apparatus according to claim 1 wherein a smallest of said radii of said compound fillet lies between a larger of said radii of the compound fillet and said first thread on said shaft.

4. Apparatus according to claim 1 wherein the threads of said nut have a gradually increasing pitch diameter in an axial direction toward said surface.

5. Apparatus according to claim 1 wherein said shaft has (i) a plurality of axially spaced ribs for disposition within at least one of said registering openings for centering the shaft relative to said opening and (ii) at least one reduced diameter portion between said ribs.

6. Apparatus according to claim 1 wherein said elongated shaft has second threads adjacent an end thereof opposite said one end, said shaft having a second unthreaded portion adjacent said second threads and located on a side of said second threads remote from said opposite end of said shaft and a second nut having threads for threaded engagement with the second threads of said shaft and a second surface for bearing engagement against another of said structures, said second nut having at least one thread closer to said second surface than remaining threads on said second nut and overlying said second unthreaded portion of said shaft, said one thread of said second nut being out of contact with the second threads of said shaft whereby said shaft is resistant to high-cycle fatigue caused by rotation of said structures.

7. Apparatus according to claim 6 wherein each said nut has at least two threads closer to respective surfaces thereof than the remaining threads on said nuts, said two threads of said first nut overlying said first unthreaded portion of said shaft and being out of contact with the threads of said shaft, said two threads of said second nut overlying said second unthreaded portion of said shaft and being out of contact with the second threads of said shaft.

8. Apparatus for enhanced high-cycle fatigue capability, comprising:

first and second structures rotatable about an axis and having openings for registration one with the other in an axial direction of the structures;

an elongated shaft passing through the registering openings and having threads at least adjacent one end of said shaft, said shaft having an unthreaded portion adjacent said threads and located on a side of said threads remote from said one end of said shaft;

a nut having threads for threaded engagement with the threads of said shaft and a surface for bearing engagement against one of said structures, said unthreaded portion of said shaft being undercut to a diameter reduced relative to a diameter of the shaft passing through the registering openings, said undercut unthreaded portion including a compound fillet of different radii for transitioning between said undercut and a first thread on the shaft adjacent said undercut and engaging a first of said remaining threads of said nut.

9. Apparatus according to claim 8 wherein a smallest of said radii of said compound fillet lies between a larger of said radii of the compound fillet and said first thread on said shaft.

10. Apparatus according to claim 8 wherein the threads of said nut have an increasing pitch diameter in an axial direction toward said surface.

11. Apparatus according to claim 8 wherein said shaft has a plurality of axially spaced ribs for disposition within at least one of said registering openings for centering the shaft relative to said opening and has at least one reduced diameter portion of said shaft between said ribs.

12. Apparatus according to claim 8 wherein a difference between the undercut diameter and a major diameter of the threads of said stud lies between 3 to 5 thread pitch less than the major diameter of the threads of said stud.

* * * * *